C. NELSON.
ALCOHOL LAMP.
APPLICATION FILED DEC. 26, 1906.
1,056,047.
Patented Mar. 18, 1913.
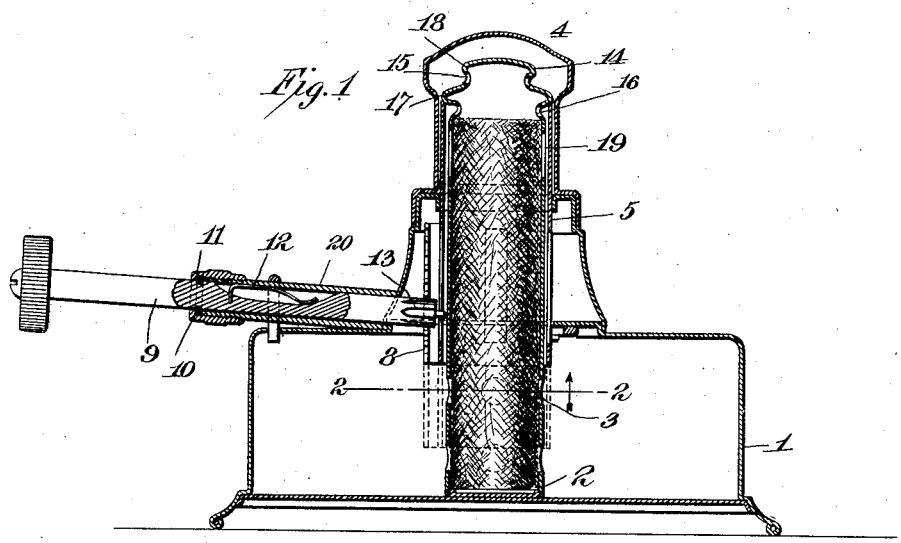
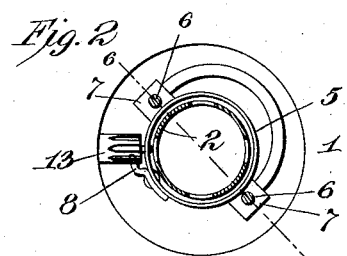
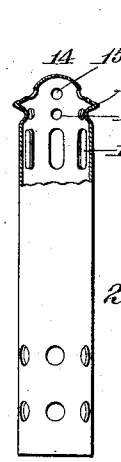
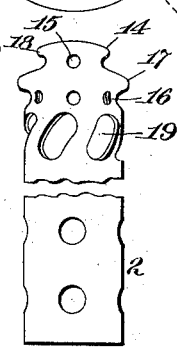
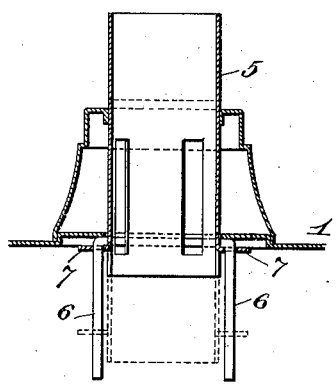
Witnesses:
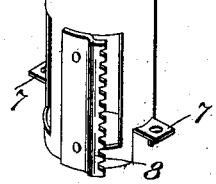
Inventor
Charles Nelson
By Dyer a Dyer
Attorneys.

UNITED STATES PATENT OFFICE.

CHARLES NELSON, OF BROOKLYN, NEW YORK, ASSIGNOR TO S. STERNAU & CO., OF NEW YORK, N. Y., A COPARTNERSHIP COMPOSED OF SIGMUND STERNAU AND LIONEL STRASSBURGER.

ALCOHOL-LAMP.

1,056,047.      Specification of Letters Patent.      Patented Mar. 18, 1913.

Application filed December 26, 1906. Serial No. 349,570.

*To all whom it may concern:*

Be it known that I, CHARLES NELSON, a subject of the King of Sweden, residing in the borough of Brooklyn, in the county of Kings, State of New York, have invented an Improvement in Alcohol-Lamps, of which the following is a specification.

This invention relates to improvements in alcohol lamps, particularly such lamps as are used in connection with chafing dishes, coffee machines and the like, and the objects of the invention are to improve the lamp in details, as will more fully appear from the accompanying drawings and specification.

In the drawings, Figure 1 is a sectional view of a lamp embodying my invention, Fig. 2 is a section on the line 2—2 thereof, Fig. 3 is an elevation of the wick-holder, Fig. 4 is a perspective view of the shield tube, Fig. 5 is a sectional elevation of a modified form of wick holder, and Fig. 6 is a section of the lamp on the line 6—6, Fig. 2.

In all of the views, like parts are designated by the same reference characters.

In carrying out my invention, I provide a casing or reservoir 1, which is shown as made of a spun top and a flat bottom secured to the top, but the structure of the casing is immaterial.

2 is the wick-holder which is preferably formed of a metal tube closed at the end, the closed end constituting the cover for the wick cap. This wick-holder is screwed to the bottom of the casing 1, but it may be secured in any other suitable manner.

3 is the wick which is shown as filling the wick tube up to the cap. This wick may be made of asbestos or cotton or, preferably, the lower part of cotton and the upper part of asbestos, in the usual manner.

4 is the usual cap covering the top of the wick-holder to prevent escape of alcohol by evaporation.

The wick-holder is surrounded by the shield tube 5 which is adapted to be adjusted in position so as to control the flame. The shield tube is supported in position by means of guide rods 6, two being shown. They are preferably made of a single piece of stiff wire with the center part curved to U-shape and soldered or otherwise secured to the underside of the top of the casing 1 in such a position that the ends will depend straight downward, as shown in Fig. 6.

These ends pass through perforations in ears 7 upon the shield tube 5 to give a support to the lower end of the shield tube and allow the latter to be raised and lowered with a minimum of friction. These ears are preferably formed integrally with the shield tube, which shield tube carries a rack 8. The adjusting rod 9, having the usual regulating wheel, is provided with a ring 10, which engages against the end of the bearing tube 20. A gland 11 forces the ring 10 against the end of the bearing tube 20 and prevents escape of alcohol gas from the inside of the tube 20. The ring 10 is preferably made of spring wire bent to annular form and sprung in a groove within the rod 9. In order to hold the rod 9 in position to prevent its too readily turning, a spring 12 is carried by the rod 9 and adapted to frictionally engage with the inside of the bearing tube 20. The inner end of the rod 9 is formed with teeth so as to constitute a pinion which engages with the rack 8, and permits the raising and lowering of the shield tube 5.

The upper end of the wick-holder 2 contains no wick and constitutes the wick cap 14. This wick cap can be a separate piece from the rest of the wick-holder and may be a casting or it may be made of brass finished to shape; it may be provided with a row of upper holes 15 and a row of lower holes 16. Between the two rows of holes is an intermediate flange 17. Above the upper holes, there may be an upper flange 18 as shown in Fig. 3, but in some forms of lamp, as will be explained, this upper flange is not necessary. The flanges 17 and 18 may be spun to shape, if desired.

Below the lower holes are the wick openings 19 exposing the wick. The shield tube is adapted to be elevated to cover the wick openings 19 and the lower holes 16, and will engage with the intermediate flange 17, making a close joint therewith.

In operation, the flame will be produced from the alcohol presented by the wick through the wick openings 19. A certain amount of the alcohol will be evaporated in the interior of the wick cap 14 and will pass out through the upper and lower holes 15 and 16 and will be ignited by the flame from the wick openings 19. After the lamp has been in operation for some time and the wick cap has become heated to its maximum intensity, a steady flame will be produced from the holes 15 and 16 as well as from the wick openings 19. To regulate the lamp the shield tube 5 is raised so that its upper edge will mask or cover the wick openings 19. As these openings are gradually covered, the flame will be reduced. When the openings are entirely covered, the flame will be much reduced and will consist entirely of burning gas which passes through the holes 15 and 16. When the shield tube is elevated so that its upper edge comes in contact with the intermediate flange 17, the lower holes 16 will be entirely covered and the only flame will be that from the gas which issues from the holes 15.

The heat produced by the burning gas from the holes 15 should be such that the contents of the vessel which is being heated will be kept warm and will not be brought to a boil. This I secure by properly proportioning the amount of metal in the wick cap and regulating its shape.

In the wick-holder shown in Fig. 3, the cap is provided with an upper flange 18 which overhangs the upper holes 15. In smaller lamps, a wick-holder such as shown in Fig. 5, will be provided in which the upper flange is shown as omitted and the amount of metal in the wick cap very much reduced. Therefore, in the smaller lamp there is not enough metal in the cap to remain heated after the lower holes 16 are closed to cause an objectionable conversion of alcohol into gas within the cap and thereby produce too much flame. In a larger wick-holder than that shown in Fig. 3, the upper flange 18 will be correspondingly enlarged, the object in every case being to so proportion the amount of metal within the cap that the conserved heat will not evaporate such a large quantity of gas that too high a flame would be produced.

The intermediate flange 17 serves an additional useful purpose in diverting the flame from the wick openings 19 and lower holes 16, so that the flame will pass upward in true annular shape unbroken at any point, as is the case with lamps having a side tube to permit the escape of gas. So the upper flange 18, when such is used, will also divert the flame and make it issue upward in true annular form.

By making the wick cap 14 with comparatively thin walls, as shown, and using comparatively large holes, more vapor is given off and the pressure within the casing 1 is correspondingly reduced. This makes it possible to use the rod 9 without a stuffing box as the pressure within the casing 1 is not sufficient to require this.

In accordance with the provisions of the patent statutes, I have described the principle of my invention, together with the apparatus which I now consider to represent the best embodiment thereof; but I desire to have it understood that the apparatus shown is merely illustrative and that the invention can be carried out in other ways.

Having now particularly described the nature of my said invention, and in what manner the same is to be performed, what I claim and desire to secure by Letters Patent is:

1. An alcohol lamp, having a fixed wick-holder and a movable tube, the said tube having perforated ears, in combination with guide rods depending from and solely supported by the top of the lamp casing and passing through the ears.

2. In an alcohol lamp, an elevating rod therefor having a ring thereon, in combination with a casing, with a bearing tube thereon and a gland for holding the ring in engagement with the end of the bearing tube.

3. An alcohol lamp having in combination, a bearing tube and an elevating rod therein, a ring on the rod, a gland for holding the ring in engagement with the tube and a spring carried by the rod for engaging with the inside of the bearing tube for frictionally holding the rod against rotation.

4. An alcohol lamp having in combination a bearing tube and an elevating rod therein, a ring on the rod, a gland for holding the ring in engagement with the tube and a spring 12, one end of said spring being secured to the rod, and the other end being forced outward into engagement with the inside of the bearing tube for frictionally holding the rod in position.

5. An alcohol lamp having a wick-holder with a wick cap at the top, the said wick cap having thin walls and large gas holes therein, the said holes being arranged in a plurality of rows with a flange between them and a movable tube for masking a row of holes, the flange acting as a stop for the tube.

6. An alcohol lamp having a wick-holder with a plurality of rows of holes in the top, a separating flange between the rows of holes and a flange above the upper row of holes and a movable tube for masking a row of holes, the separating flange acting as a stop for the tube.

7. An alcohol lamp having a wick holder, a wick cap at one end thereof, the said wick cap being formed of thin metal and being provided with a plurality of rows of perforations separated by a flange, whereby only enough heat will be retained in the metal to produce conversion of alcohol into gas sufficient to produce a gentle flame when the lower row of perforations is closed.

8. An alcohol lamp, having in combination, a bearing tube and an adjusting rod therein, a peripheral groove in the rod, a ring in the groove and a gland for holding the ring in engagement with the tube, the said adjusting rod having a longitudinal notch and a spring 12 lying within such notch, one end of the spring being secured to the rod and the other end being forced upward into contact with the inside of the bearing tube for frictionally holding the rod against rotation.

9. A wick tube having a wick cap at one end thereof, the said wick cap having a plurality of rows of holes separated by a flange, means for closing the lower row of holes, the walls of the cap being made of very thin metal so as to produce conversion of alcohol into gas sufficient to produce a gentle flame when the lower row of holes is closed.

This specification signed and witnessed this fifth day of October, 1906.

CHARLES NELSON.

Witnesses:
 ROBT. E. TAYLOR,
 A. P. WILKES.

Copies of this patent may be obtained for five cents each, by addressing the "Commissioner of Patents, Washington, D. C."